(12) United States Patent
Strauss

(10) Patent No.: US 8,580,371 B2
(45) Date of Patent: Nov. 12, 2013

(54) SELF-CLEANING SUPERHYDROPHOBIC SURFACE

(75) Inventor: Dennis R. Strauss, Ventura, CA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 12/689,035

(22) Filed: Jan. 18, 2010

(65) Prior Publication Data
US 2010/0116669 A1    May 13, 2010

Related U.S. Application Data

(62) Division of application No. 11/030,501, filed on Jan. 6, 2005, now Pat. No. 7,695,767.

(51) Int. Cl.
| | |
|---|---|
| *B32B 5/00* | (2006.01) |
| *B32B 5/18* | (2006.01) |
| *B32B 15/04* | (2006.01) |
| *B32B 15/08* | (2006.01) |
| *B32B 15/082* | (2006.01) |
| *B32B 15/14* | (2006.01) |
| *B32B 18/00* | (2006.01) |

(52) U.S. Cl.
USPC ........... 428/142; 428/141; 428/336; 428/339; 428/364; 428/375; 428/376; 428/378; 428/398; 428/421; 428/422; 428/457; 428/469; 428/472; 428/472.1; 427/419.2; 427/419.5; 205/198; 205/199; 205/200; 205/220

(58) Field of Classification Search
None
See application file for complete search history.

(56) References Cited

U.S. PATENT DOCUMENTS

| | | | |
|---|---|---|---|
| 3,257,244 A | 6/1966 | Barkman | |
| 3,428,415 A | 2/1969 | Chiola et al. | |
| 5,368,892 A * | 11/1994 | Berquier | 427/299 |
| 5,756,788 A * | 5/1998 | Mitchnick et al. | 556/10 |
| 5,766,698 A * | 6/1998 | Singh et al. | 427/601 |
| 5,981,425 A * | 11/1999 | Taoda et al. | 502/208 |
| 6,037,289 A * | 3/2000 | Chopin et al. | 502/2 |
| 6,284,314 B1 * | 9/2001 | Kato et al. | 427/245 |
| 6,362,121 B1 * | 3/2002 | Chopin et al. | 502/2 |
| 6,680,135 B2 * | 1/2004 | Boire et al. | 428/702 |
| 6,881,445 B1 * | 4/2005 | Arora | 427/248.1 |
| 6,953,603 B2 * | 10/2005 | Nonninger et al. | 427/226 |
| 7,011,737 B2 | 3/2006 | Varghese et al. | |

(Continued)

FOREIGN PATENT DOCUMENTS

| | | |
|---|---|---|
| DE | 10324518 | * 11/2003 |
| JP | 10-226766 | * 8/1998 |

OTHER PUBLICATIONS

Dawei Gong et al., "Titanium Oxide Nanotube Arrays Prepared by Anodic Oxidation," J. Mater. Res., vol. 16, No. 12, Dec. 2001, pp. 3331-3334.

*Primary Examiner* — Vivian Chen
(74) *Attorney, Agent, or Firm* — Harness, Dickey & Pierce, P.L.C.

(57) ABSTRACT

A superhydrophobic structure that may have a titanium substrate and nanoporous titanium oxide layer grown on the titanium substrate by anodization. The titanium oxide layer may have a plurality of nano-tube structures that create a microscopically rough surface on the titanium substrate. A hydrophobic coating may be deposited over the titanium oxide layer to create a superhydrophobic surface on the titanium substrate. The titanium oxide layer may provide a photocatalytic reaction with oxygen in surrounding air to oxidize organic contaminants on the superhydrophobic surface.

16 Claims, 3 Drawing Sheets

(56) References Cited

U.S. PATENT DOCUMENTS

| | | |
|---|---|---|
| 7,285,331 B1 | 10/2007 | Reihs et al. |
| 7,393,391 B2 * | 7/2008 | Lopez et al. .................. 96/11 |
| 7,695,767 B2 * | 4/2010 | Strauss .................. 427/299 |
| 2005/0115840 A1 | 6/2005 | Dolan |
| 2006/0147634 A1 | 7/2006 | Strauss |
| 2007/0014970 A1 | 1/2007 | Nun et al. |

\* cited by examiner

SELF-CLEANING SUPERHYDROPHOBIC SURFACE

CROSS-REFERENCE TO RELATED APPLICATIONS

This application is a divisional of U.S. patent application Ser. No. 11/030,501 filed on Jan. 6, 2005, U.S. Pat. No. 7,695,797. The entire disclosure of the above application is incorporated herein by reference.

FIELD OF INVENTION

The invention relates generally to surfaces that are susceptible to ice, water and other contaminant buildup. More particularly, the invention relates to superhydrophobic surfaces that resist ice, water and other contaminant buildup.

BACKGROUND OF THE INVENTION

The surfaces of many structures, such as many aircraft surfaces, are susceptible to the buildup of ice, water and other contaminants that can interfere with the uses of such surfaces. For example, the buildup of ice, water and/or other contaminants on aircraft wings, propellers, rotors and other functional surfaces can dangerously interfere with the designed performance of such surfaces and cause catastrophic risks to the operation of the aircraft. When such buildups occur, much time and cost can be expended in removing the buildup.

Superhydrophobic surfaces on such structures can prevent or mitigate the buildup of ice, water and other contaminants. A superhydrophobic surface is formed by creating a microscopically rough surface containing sharp edges and air pockets in a material of poor wettability. That is, a material that is not easily wettable and sheds water well. On a superhydrophobic surface, a drop of water will form a nearly spherical bead that will roll when the surface is tilted slightly. Thus, superhydrophobic surfaces shed water and snow easily. Furthermore, superhydrophobic surfaces resist soiling by waterborne and other contaminants, and are easily cleaned and useful in directing flow in microfluidic devices. However, superhydrophobic surfaces are susceptible to contamination by organic substances such as oil and/or grease, which render the surface merely hydrophobic such that water will bead up, but stick in place on the surface.

Therefore, it is highly desirable to provide structures, for example, aircraft wings, propellers, rotors and other functional structures, with superhydrophobic surfaces that are highly resistant to the build up of organic contaminants such as oil and grease.

BRIEF SUMMARY OF THE INVENTION

In one aspect the present disclosure relates to a superhydrophobic structure. The structure may comprise a titanium substrate and a nanoporous titanium oxide layer grown on the titanium substrate. The nanoporous titanium oxide layer may be grown by anodization. The titanium oxide layer may comprise a plurality of nano-tube structures that create a microscopically rough surface on the titanium substrate. A hydrophobic coating may be deposited over the titanium oxide layer to create a superhydrophobic surface on the titanium substrate. The titanium oxide layer may provide a photocatalytic reaction with oxygen in surrounding air to oxidize organic contaminants on the superhydrophobic surface.

In another aspect the present disclosure may relate to a superhydrophobic structure that may comprise a titanium substrate and a nanoporous titanium oxide layer grown on the titanium substrate. The nanoporous titanium oxide layer may be grown by coating the titanium substrate with a hydrofluoric acid electrolyte and applying a voltage across the titanium substrate such that current flows through the titanium substrate and the hydrofluoric acid electrolyte. The current causes a titanium oxide layer to grow. The titanium oxide layer may comprise a plurality of nano-tube structures that create a microscopically rough surface on the titanium substrate. A hydrophobic coating may be deposited over the titanium oxide layer to create a superhydrophobic surface on the titanium substrate.

In still another aspect the present disclosure relates to a superhydrophobic structure that may comprise a titanium substrate and a nanoporous titanium oxide layer grown on the titanium substrate. The nanoporous titanium oxide layer may be grown by coating the titanium substrate with a hydrofluoric acid electrolyte and applying an electrical signal across the titanium substrate. The titanium oxide layer may comprise a plurality of nano-tube structures that create a microscopically rough surface on the titanium substrate. A hydrophobic coating may be deposited over the titanium oxide layer to create a superhydrophobic surface on the titanium substrate. The hydrophobic coating may be comprised of at least one of a polytetrafluoroethylene, or a fluorocarbon, or a fluorinated alkylsilane.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of various embodiments is merely exemplary in nature and is in no way intended to limit the invention, its application or uses. Additionally, the advantages provided by the embodiments, as described below, are exemplary in nature and not all embodiments provide the same advantages or the same degree of advantages.

Figure 1:
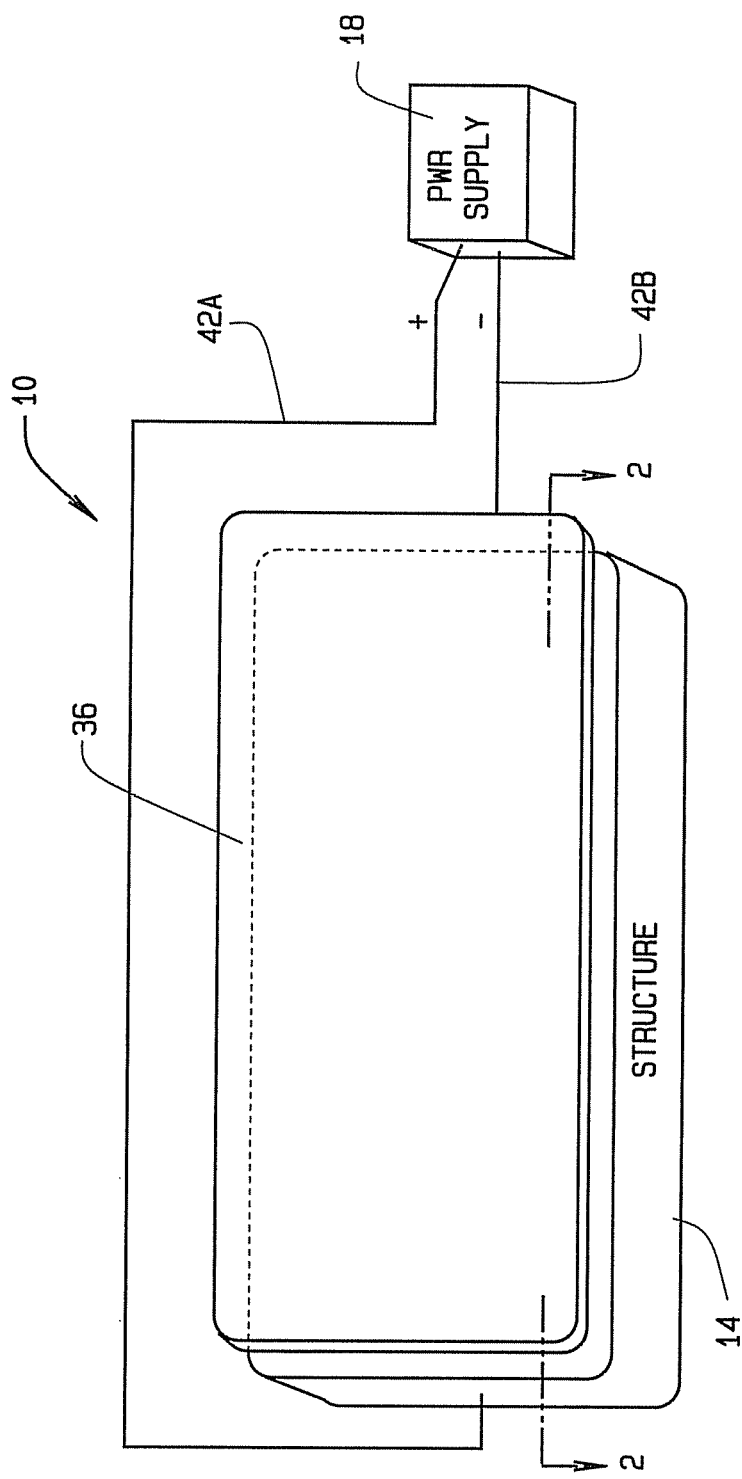
FIG. 1 is a block diagram of a system for generating a superhydrophobic surface on structure.

FIG. 1 is a block diagram of a system 10 for generating a superhydrophobic surface on structure 14. The structure 14 can be any surface susceptible to the build up of ice, water and/or other contaminants. For example, the structure 14 can be aircraft wings, propellers, rotors and other functional surfaces of an aircraft where the build up of ice, water and/or other contaminants can dangerously interfere with the designed performance of such surfaces and cause catastrophic risks to the operation of the aircraft. Generally, the system 10 includes the structure 14 and a power supply 18 that is used to provide a voltage across the structure 14, as described in detail below. The power supply 18 is preferably a direct current (DC) voltage source. In one implementation, the power supply 18 is a DC voltage source.

Figure 2A:
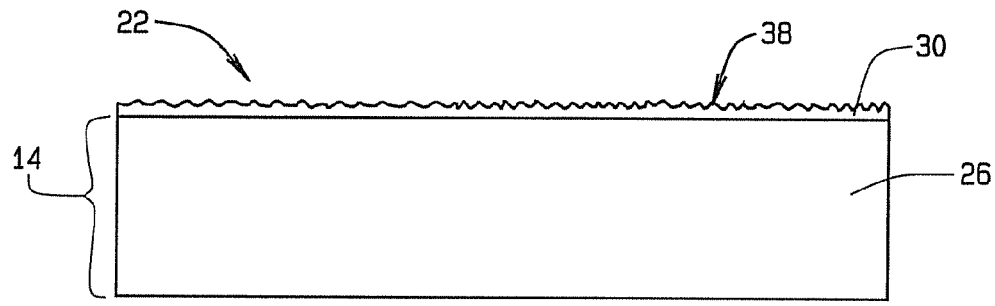
FIG. 2A is a cross-sectional view of a superhydrophobic structure created utilizing the system shown in FIG. 1 along line 2-2 of the structure shown in FIG. 1, in accordance with a preferred embodiment of the present invention.
Figure 2B:
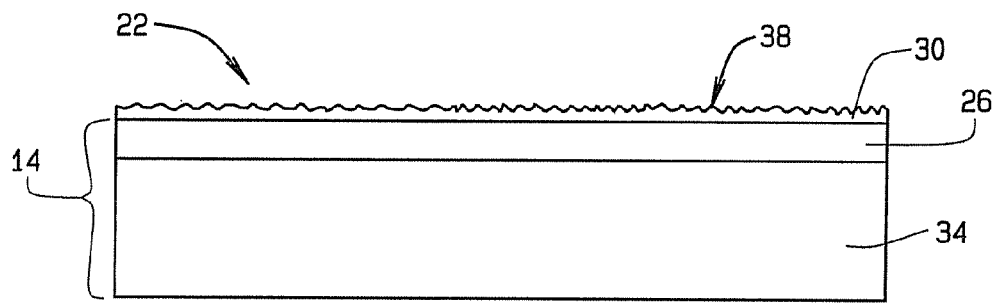
FIG. 2B is a cross-sectional view of a superhydrophobic structure created utilizing the system shown in FIG. 1 along line 2-2 of the structure shown in FIG. 1, in accordance with another preferred embodiment of the present invention.

FIG. 2A is a cross-sectional view of a superhydrophobic structure 22 created utilizing the system 10 along line 2-2 of the structure 14 shown in FIG. 1, in accordance with an embodiment of the present invention. The superhydrophobic structure 22 includes the structure 14 constructed of titanium, which is referred to herein as a titanium substrate 26. Additionally, the superhydrophobic structure 22 includes a nanoporous titanium oxide layer 30 grown across at least a portion of the surface of the titanium substrate 26. Alternatively, as shown in FIG. 2B, the structure 14 is constructed of a base substrate 34 bonded to the titanium substrate 26 that has the nanoporous titanium oxide layer 30 grown across at least of portion thereof. The base substrate 34 can be any metal or composite suitable for bonding with the titanium substrate 26.

The nanoporous titanium oxide layer 30 is grown on the titanium substrate 26 by anodization. To anodize the titanium substrate 26, a coating of hydrofluoric acid is applied to the titanium substrate 26. The hydrofluoric acid is an electrolyte for the anodization process and can be applied using any suitable means for applying a sufficiently even coat across all portions of the titanium substrate 26 desired to be anodized. For example the hydrofluoric acid can be sprayed or brushed onto the titanium substrate 26 or the structure 14 can be dipped into a solution of hydrofluoric acid. In one embodiment, the titanium substrate 26 is polished prior to application of the hydrofluoric acid to make the surface of the titanium substrate smooth. The titanium substrate 26 can be polished using any suitable polishing means, such as electro-polishing.

The power supply 18, shown in FIG. 1, is utilized to apply a voltage across the titanium substrate 26 such that current flows through the titanium substrate 26. The power supply 18 includes a pair of electrodes 42. A positive electrode 42A is connected to the structure 14 that acts an anode. A negative electrode 42B is connected to a conductive plate 36 (shown in FIG. 1) that acts as a cathode. In one implementation the cathode, i.e. conductive plate 36, is approximately the same size as the titanium substrate 26. The cathode is connected to titanium substrate 26 after the hydrofluoric acid has been applied such that the hydrofluoric acid is sandwiched between the cathode and the titanium substrate 26. When voltage is applied across the titanium substrate 26, current flowing through the titanium substrate 26 and the hydrofluoric acid cause an electrochemical reaction between the hydrofluoric acid and the titanium substrate 26 that anodizes the surface of the titanium substrate 26. This anodization induces the titanium oxide layer 30 to grow on the titanium substrate 26. The resulting titanium oxide layer 30 has a microscopically rough surface texture that comprises a plurality, e.g. thousands, of nano-tube structures 38.

The nano-tube structures 38 are microscopic structures that protrude from the surface of the titanium substrate 26, i.e. from the titanium oxide layer 30. For example, the nano-tube structures 38 can be 16 nanometers in diameter and thickness. The nano-tube structures 38 create a microscopically rough surface containing sharp points and valleys in the titanium oxide layer 30. Any remaining hydrofluoric acid is washed off the nano-tube structures 38 so that a conformal hydrophobic film or coating can be deposited onto the titanium oxide layer 30. The hydrophobic coating can be deposited from a plasma, a solution or a gas. The hydrophobic coating is deposited onto the titanium oxide layer 26 to render the surface of the titanium substrate 26 superhydrophobic. The resulting superhydrophobic surface is effectively self-cleaning because the titanium oxide layer 30 has a photocatalytic reaction with oxygen in surrounding air when exposed to ultraviolet light, e.g. sunlight. The photocatalytic reaction photooxidizes any organic contaminants that may gather on the superhydrophobic surface. The hydrophobic coating can be deposited over the titanium oxide layer 30 using any suitable means. For example, the hydrophobic coating can be sprayed on, evaporated on, or the structure 14 with the titanium oxide layer 30 can be dipped into a suitable solution.

Figure 3:
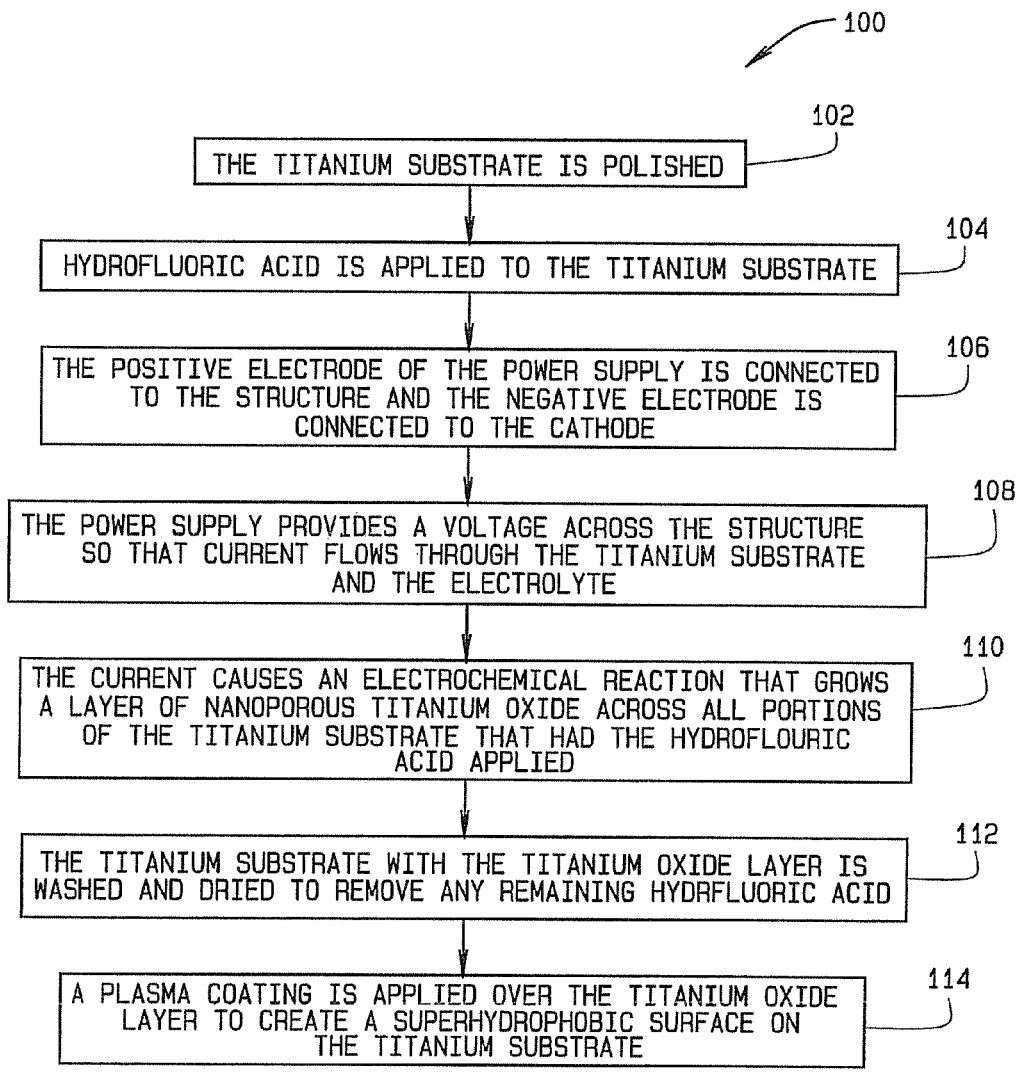
FIG. 3 is a flow chart of a method for providing a superhydrophobic surface on the structure shown in FIG. 1, in accordance with a preferred embodiment of the present invention.

FIG. 3 is a flow chart 100 of a method for providing the superhydrophobic surface on the structure 14, in accordance with one embodiment of the present invention. Initially, the titanium substrate is polished using any suitable polishing process, e.g. electro polishing, as indicated at 102. Hydrofluoric acid is then applied to all portions of the titanium substrate 26 desired to have a superhydrophobic surface, as indicated at 104. The hydrofluoric acid is applied using any suitable application process, e.g. spraying or brushing the hydrofluoric acid onto the titanium substrate 26 or dipping structure 14 into a hydrofluoric acid solution. In one embodiment the hydrofluoric acid is a 0.5% aqueous hydrofluoric acid solution. Alternatively, the hydrofluoric acid can be applied to the titanium substrate 26 without first polishing the titanium substrate 26. Next, the positive electrode 42A of the power supply 18 is connected to the structure 14 and the negative electrode 42B is connected to cathode, i.e. conductive plate 36, as indicated at 106. The power supply 18 provides a voltage across to the structure 14 and cathode so that current flows through the titanium substrate 26 and the electrolyte, i.e. the hydrofluoric acid, as indicated at 108. In one implementation the voltage is a DC voltage between +1 and +20 VDC, for example +17 VDC. The current flowing through the titanium substrate 26 causes the hydrofluoric acid and the titanium substrate to undergo an electrochemical reaction that grows the layer 30 of nanoporous titanium oxide across all portions of the titanium substrate 26 that had the hydrofluoric acid applied, as indicated at 110. The titanium oxide layer 30 comprising a plurality, e.g. thousands to hundreds of thousands, of microscopic nano-tube structures 38.

The titanium substrate 26 having the titanium oxide layer 30 is washed and dried to remove any remaining hydrofluoric acid from the titanium oxide layer 30, as indicated at 112. Once the remaining hydrofluoric acid is washed away the nano-tube structures 38 in the titanium oxide layer 30 create a microscopically rough surface texture surface on the titanium substrate 26. A hydrophobic coating is then applied over the titanium oxide layer 30 to create a superhydrophobic surface on the titanium substrate 26, as indicated at 114. In one implementation the hydrophobic coating is applied to be a substantially even layer approximately 1 to 10 nanometers thick across the titanium oxide layer 30. The hydrophobic coating can be any suitable hydrophobic coating that, when applied to the washed titanium oxide layer 30 will provide a superhydrophobic surface on the titanium substrate 26, i.e. on the structure 14. For example, the hydrophobic coating can be suitable polytetrafluoroethylene (Teflon®) precursors, suitable fluorocarbons or fluorinated alkylsilane. In a preferred implementation the hydrophobic coating comprises $CF_3(CF_2)_5(CH_2)_2Si(OC_2H_5)_3$ (tridecafluoro-1,1,2,2-tetrahydrooctyl) trethoxysilane vapor applied to the titanium oxide layer 30 and baked at an appropriate temperature for an appropriate time, e.g. 110° C. (230° F.) for approximately 10 minutes.

The resulting superhydrophobic surface is furthermore self-cleaning due to a photocatalytic reaction of the titanium oxide layer 30 with oxygen in surrounding air. More specifically, when the superhydrophobic surface is exposed to an ultraviolet light source, such as the sun, the photocatalytic reaction of the titanium oxide with oxygen oxidizes any organic contaminants on the superhydrophobic surface, e.g. dirt, oil and grease.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A superhydrophobic aircraft structure comprising:
   a titanium substrate forming a functional surface portion of the aircraft structure;
   a nanoporous titanium oxide layer grown on the titanium substrate by anodization, the titanium oxide layer comprising a plurality of nano-tube structures that create a microscopically rough surface on the titanium substrate; and
   a conformal hydrophobic coating deposited over the titanium oxide layer to create a superhydrophobic surface on the titanium substrate, whereby the titanium oxide layer provides a photocatalytic reaction with oxygen in surrounding air to oxidize organic contaminants on the superhydrophobic surface; and
   wherein the hydrophobic coating that is deposited over the titanium oxide layer includes a thickness of approximately 1 to 10 nanometers.

2. The aircraft structure of claim 1, wherein the titanium oxide layer is grown by coating the titanium substrate with a hydrofluoric acid electrolyte and applying a DC voltage across the titanium substrate such that current flows through the titanium substrate and the hydrofluoric acid electrolyte to grow the titanium oxide layer.

3. The aircraft structure of claim 2, wherein the voltage applied comprises a DC voltage between 1 and 20 volts.

4. The aircraft structure of claim 2, wherein the titanium oxide layer is grown by polishing the surface of the titanium substrate prior to applying the coating of hydrofluoric acid.

5. The aircraft structure of claim 1, wherein the hydrophobic coating comprises one of polytetrafluoroethylene, a fluorocarbon and fluorinated alkylsilane.

6. A superhydrophobic aircraft structure comprising:
   a titanium substrate forming a functional surface portion of the aircraft structure;
   a nanoporous titanium oxide layer grown on the titanium substrate by coating the titanium substrate with a hydrofluoric acid electrolyte and applying a voltage of at least about 1 volt DC to no more than about 20 volts DC across the titanium substrate such that current flows through the titanium substrate and the hydrofluoric acid electrolyte to grow the titanium oxide layer, the titanium oxide layer comprising a plurality of nano-tube structures that create a microscopically rough surface on the titanium substrate, and the nano-tube structures having diameters of approximately 16 nanometers; and
   a conformal hydrophobic coating deposited over the titanium oxide layer to create a superhydrophobic surface on the titanium substrate.

7. The superhydrophobic aircraft structure of claim 6, wherein the titanium oxide layer provides a photocatalytic reaction with oxygen in surrounding air to oxidize organic contaminants on the superhydrophobic surface.

8. The superhydrophobic aircraft structure of claim 6, wherein the hydrophobic coating is deposited over the titanium oxide layer in a coating layer approximately no greater than about 10 nanometers in thickness.

9. The superhydrophobic aircraft structure of claim 6, wherein the hydrophobic coating is deposited over the titanium oxide layer in a coating layer having a thickness of at least about 1 nanometer in thickness.

10. The superhydrophobic aircraft structure of claim 9, wherein the coating layer has a thickness of at least about 1 nanometer in thickness, and no more than about 10 nanometers in thickness.

11. The superhydrophobic aircraft structure of claim 6, wherein the hydrophobic coating comprises one of polytetrafluoroethylene, a fluorocarbon and fluorinated alkylsilane.

12. The superhydrophobic aircraft structure of claim 6, wherein the titanium oxide layer comprises a polished surface resulting from polishing of the titanium substrate prior to applying the coating of hydrofluoric acid.

13. A superhydrophobic aircraft structure comprising:
    a titanium substrate forming a functional surface portion of the aircraft structure;
    a nanoporous titanium oxide layer grown on the titanium substrate by coating the titanium substrate with a hydrofluoric acid electrolyte and applying an electrical signal of at least about 1 volt DC to no more than about 20 volts DC across the titanium substrate to grow the titanium oxide layer;
    the titanium oxide layer comprising a plurality of nano-tube structures each having a diameter of about 16 nanometers that create a microscopically rough surface on the titanium substrate; and
    a conformal hydrophobic coating having a thickness of between about 1-10 nanometers deposited over the titanium oxide layer to create a superhydrophobic surface on the titanium substrate, the hydrophobic coating being comprised of at least one of:
    a polytetrafluoroethylene;
    a fluorocarbon; and
    a fluorinated alkylsilane.

14. The superhydrophobic aircraft structure of claim 13, wherein the wherein the titanium oxide layer provides a photocatalytic reaction with oxygen in surrounding air to oxidize organic contaminants on the superhydrophobic surface.

15. The superhydrophobic aircraft structure of claim 13, wherein the electrical signal comprises a DC voltage that is applied across the titanium substrate.

16. The superhydrophobic aircraft structure of claim 13, wherein the electrical signal comprises a DC voltage signal.

* * * * *